US012766474B2

(12) United States Patent
Wei

(10) Patent No.: US 12,766,474 B2
(45) Date of Patent: Oct. 20, 2026

(54) STIRRING ASSEMBLY FOR STIRRING CUP

(71) Applicant: Guoxin Wei, Shenzhen (CN)

(72) Inventor: Guoxin Wei, Shenzhen (CN)

( * ) Notice: Subject to any disclaimer, the term of this patent is extended or adjusted under 35 U.S.C. 154(b) by 470 days.

(21) Appl. No.: 18/514,377

(22) Filed: Nov. 20, 2023

(65) Prior Publication Data

US 2025/0135419 A1 May 1, 2025

(30) Foreign Application Priority Data

Oct. 30, 2023 (CN) ......................... 202322938441.3

(51) Int. Cl.

*B01F 35/31* (2022.01)
*B01F 27/07* (2022.01)
*B01F 35/32* (2022.01)
*B01F 35/33* (2022.01)
*B01F 35/30* (2022.01)

(52) U.S. Cl.

CPC .............. *B01F 35/31* (2022.01); *B01F 27/07* (2022.01); *B01F 35/3204* (2022.01); *B01F 35/33* (2022.01); *B01F 2035/352* (2022.01)

(58) Field of Classification Search

CPC . B01F 35/31; B01F 35/33; B01F 27/07; A47J 43/046; A47J 43/0716; A47J 43/0722
See application file for complete search history.

(56) References Cited

U.S. PATENT DOCUMENTS

| | | | | |
|---|---|---|---|---|
| 4,889,248 | A * | 12/1989 | Bennett | A47J 43/046 215/390 |
| 6,523,993 | B2 * | 2/2003 | Williams | A47J 43/085 366/279 |
| 7,371,004 | B1 * | 5/2008 | Branson, III | A47J 43/046 366/205 |
| 7,766,185 | B2 | 8/2010 | Herbert | |
| 9,173,525 | B2 * | 11/2015 | McGill | A47J 43/085 |
| 9,364,806 | B2 * | 6/2016 | King | A47J 36/2411 |
| 9,775,454 | B2 * | 10/2017 | Gonzalez | B01F 33/50111 |
| 10,010,221 | B2 * | 7/2018 | Pan | A47J 43/0761 |
| 10,441,100 | B2 | 10/2019 | Oneal | |
| 10,893,775 | B2 * | 1/2021 | Sapire | A47J 43/085 |
| 11,427,458 | B2 | 8/2022 | Mullenaux | |
| 11,524,884 | B2 | 12/2022 | GonçAlves Martins et al. | |
| 2005/0047272 | A1 * | 3/2005 | Sands | A47J 43/06 366/205 |
| 2019/0069725 | A1 | 3/2019 | Wang | |
| 2021/0068567 | A1 | 3/2021 | Ganter, I et al. | |

FOREIGN PATENT DOCUMENTS

| | | | | |
|---|---|---|---|---|
| PT | 3530159 T | * | 9/2020 | A47J 43/0716 |

* cited by examiner

*Primary Examiner* — Marc C Howell

(57) ABSTRACT

Provided herein is a stirring assembly for a stirring cup, including: a transmission member with the bottom thereof connected to an output end of an electric motor; a rotating shaft with one end thereof fixedly connected to the top of the transmission member; a bearing, where the other end of the rotating shaft can penetrate through the center of the bearing and be fixedly connected to the bearing; a fixing bin, where the fixing bin is internally provided with an accommodating space for placing the transmission member and the bearing, and the top of the fixing bin is provided with a first hole; and a stirring member, where the other end of the rotating shaft can penetrate through the first hole to be connected to the stirring member.

14 Claims, 10 Drawing Sheets

STIRRING ASSEMBLY FOR STIRRING CUP

CROSS REFERENCE

This application claims priority benefits to Chinese Patent Application No. 202322938441.3, filed Oct. 30, 2023, the contents of which are incorporated herein by reference.

TECHNICAL FIELD

The present disclosure relates to the field of accessories in stirring cups, in particular to a stirring assembly for a stirring cup.

BACKGROUND

For a stirring assembly in the prior art, an output end of an electric motor thereof is directly connected to a stirring member thereof, a rotating shaft is usually fixed by hard rubber, the sliding friction force is relatively great, and long-term use will result in energy loss and relatively high noise; in addition, after long-term use, a hole in the middle will be enlarged due to the unstable axis, and the phenomenon of water leakage of a stirring cup occurs subsequently after the hole is enlarged.

SUMMARY

The present disclosure aims to provide a stirring assembly for a stirring cup, which reduces the friction force between an electric motor and a rotating shaft, also reduces the noise, and can prolong the service life of the stirring cup.

In order to achieve the above purpose, the present disclosure provides the following technical solution:

the stirring assembly for the stirring cup comprises: a transmission member with the bottom thereof connected to an output end of an electric motor; a rotating shaft with one end thereof fixedly connected to the transmission member; a bearing which is coaxial with the rotating shaft and is sleeved on the transmission member or the rotating shaft; a fixing bin, where the fixing bin is internally provided with an accommodating space for placing the transmission member and the bearing, and the top of the fixing bin is provided with a first hole; and a stirring member, where the other end of the rotating shaft can penetrate through the first hole to be connected to the stirring member, and the stirring member uniformly blends materials in the stirring cup by performing rotating motion in the stirring cup.

Further, the fixing bin is internally provided with a bearing mounting groove for accommodating the bearing, and the fixing bin is fixedly connected to the bearing by means of the bearing mounting groove.

Further, an inner wall of the bearing mounting groove is provided with a plurality of extrusion strips, the plurality of extrusion strips are uniformly distributed along the circumference of the inner wall, and the fixing bin is connected to the bearing in an interference fit manner by means of the extrusion strips of the bearing mounting groove.

Further, an inner top of the bearing mounting groove is provided with a sunken groove with the diameter smaller than the top diameter of the bearing mounting groove.

Further, the transmission member comprises a hard transmission member, a shaft fixing member is provided at the center of the top of the hard transmission member, the bearing is coaxially and securely sleeved on an outer wall of the shaft fixing member, and the shaft fixing member is coaxially and fixedly connected to one end of the rotating shaft.

Further, the transmission member further comprises a soft transmission member, the hard transmission member is wrapped with the soft transmission member, and the soft transmission member is provided with a plurality of transmission grooves; and the hard transmission member is provided with a plurality of bumps, and each of the transmission grooves is fixedly connected to the respective bump in a matching manner.

Further, the stirring assembly further comprises a waterproof member, where the waterproof member is sleeved on the rotating shaft between the fixing bin and the stirring member.

Further, the top of the fixing bin further comprises a shaft fixing sleeve, the waterproof member is provided with a groove adapted to the shaft fixing sleeve, and the shaft fixing sleeve is configured to position the waterproof member and serves as a waterproof platform.

Further, the soft transmission member is a soft rubber member, and an outer surface or a lower surface of the hard transmission member is completely wrapped with the soft transmission member.

Further, the rotating shaft is detachably connected to the stirring member; and an outer wall of the position of the rotating shaft connected to the stirring member is provided with knurling for increasing the friction force.

According to the analysis, it can be seen that for the stirring assembly for the stirring cup disclosed herein, the bearing is added to the shaft between the stirring member and the electric motor, and the bearing is placed into the fixing bin; the shaft is fixedly connected to an inner diameter of the bearing, and the shaft is vertical such that the shaft is not required to be vertically fixed again; and an outer diameter of the bearing is fixed to the bearing mounting groove of the fixing bin, and thus a transmission assembly is high in durability, free of noise, better in transmission and capable of reducing abrasions.

With the technical solution of the present disclosure, the operation difficulty is reduced, the replacement time for the stirring member is greatly shortened, the working intensity is greatly reduced, and meanwhile, the cost is saved.

BRIEF DESCRIPTION OF THE DRAWINGS

Drawings constituting a portion of the present application are used for providing a further understanding to the present disclosure. Schematic embodiments of the present disclosure and descriptions thereof are intended to explain the present disclosure, and should not be construed to unduly limit the present disclosure. In the drawings.

Figure 1:
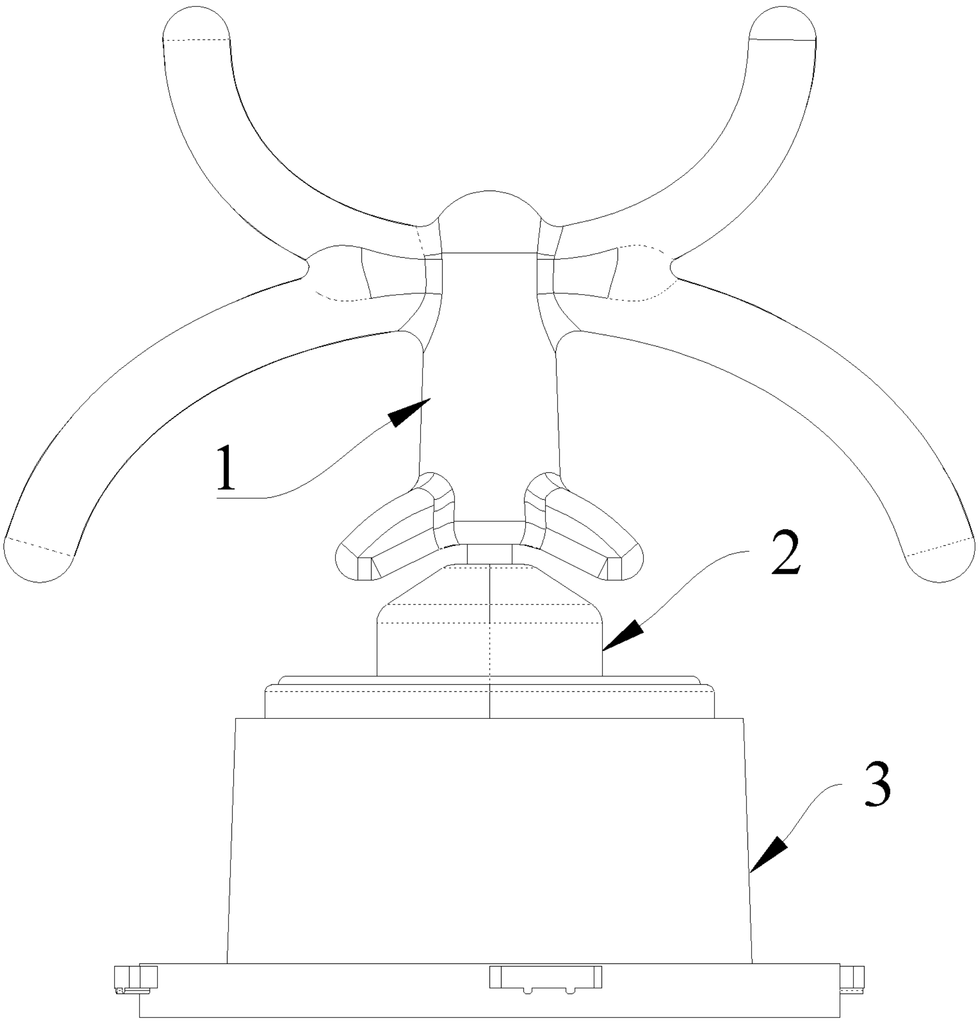
FIG. 1 is a structure diagram of a stirring assembly for a stirring cup in the present disclosure.
Figure 2:
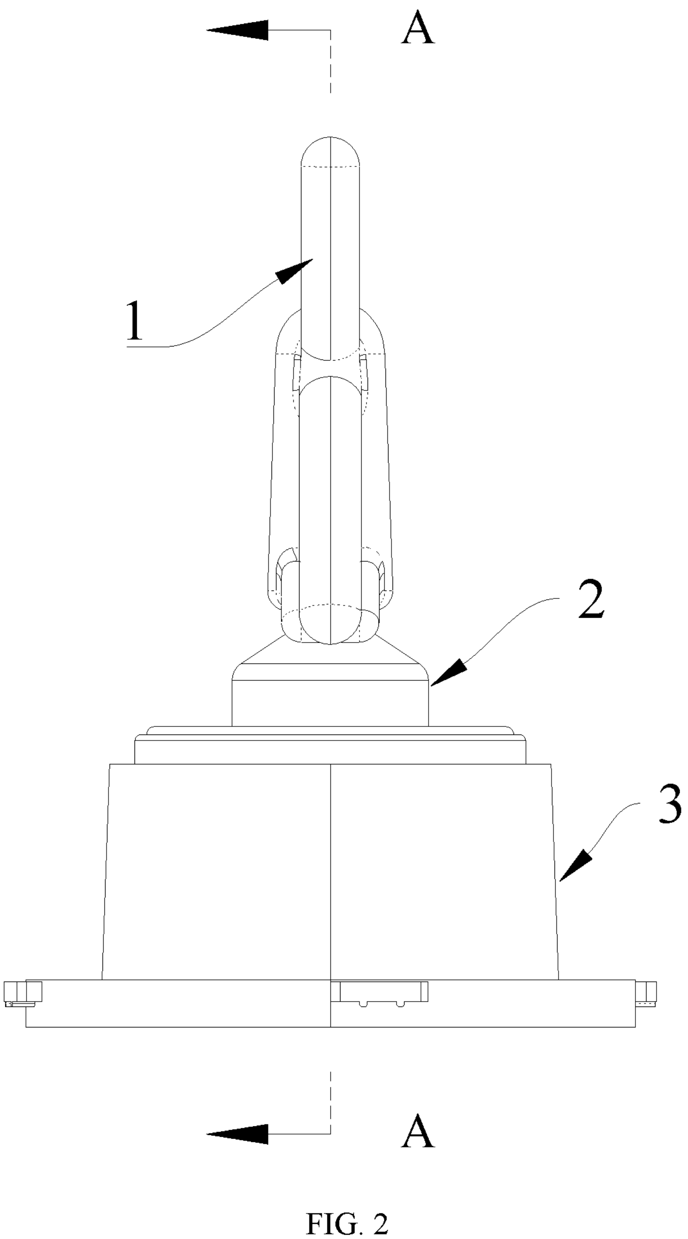
FIG. 2 is a left structure view of the stirring assembly for the stirring cup in the present disclosure.
Figure 3:
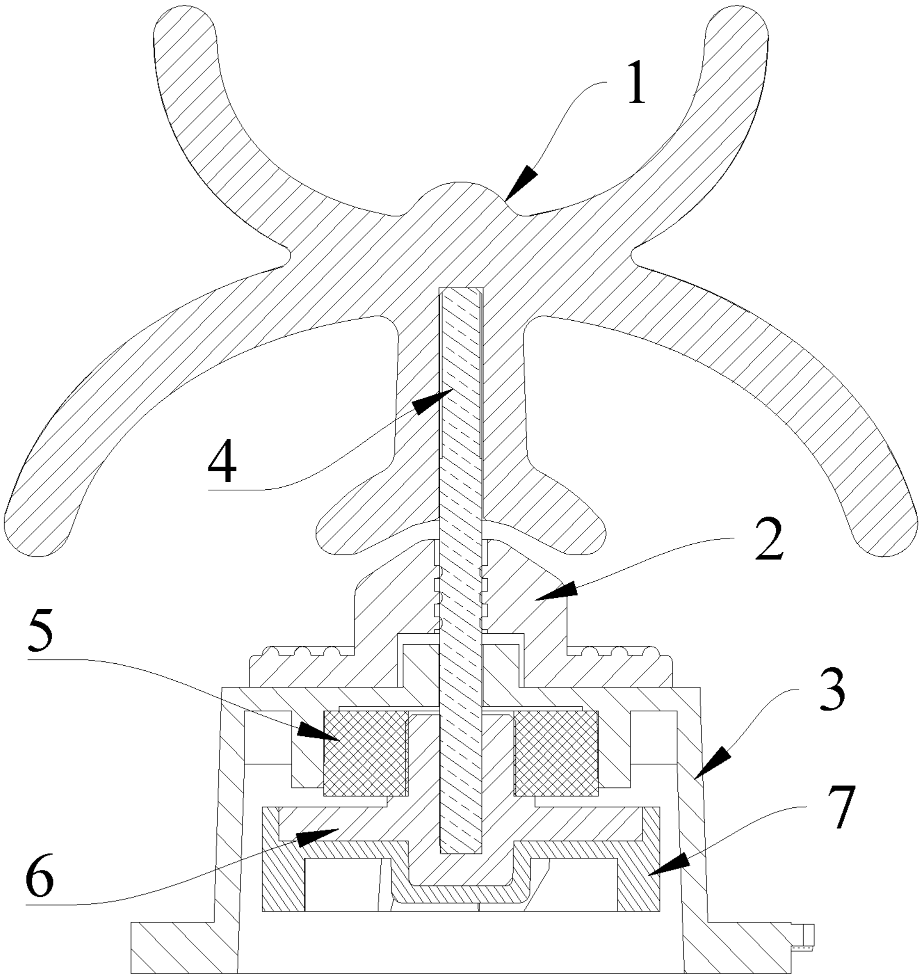
FIG. 3 is a section view of the stirring assembly in Embodiment 1 in FIG. 2 of the present disclosure in the direction A-A.
Figure 4:
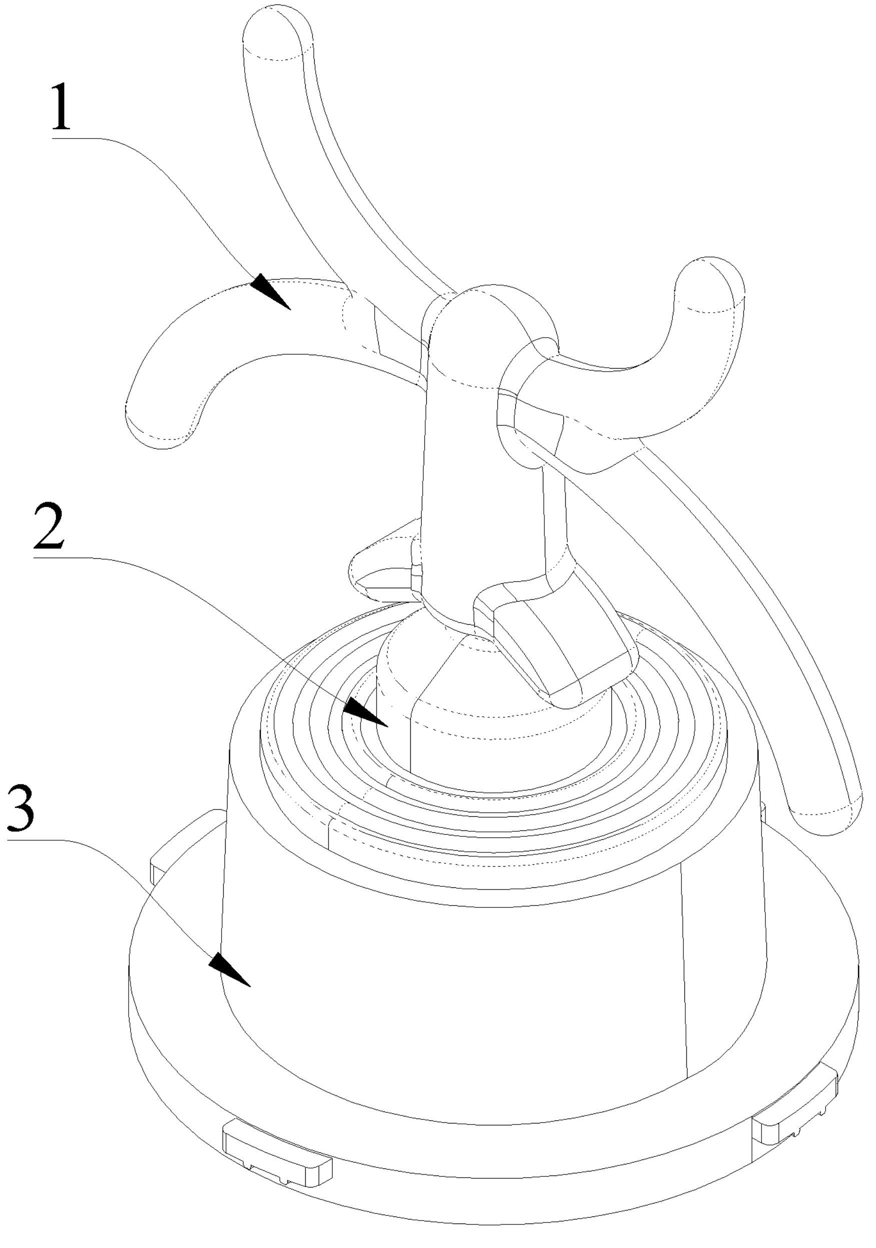
FIG. 4 is a stereogram of the stirring assembly for the stirring cup in the present disclosure.
Figure 5:
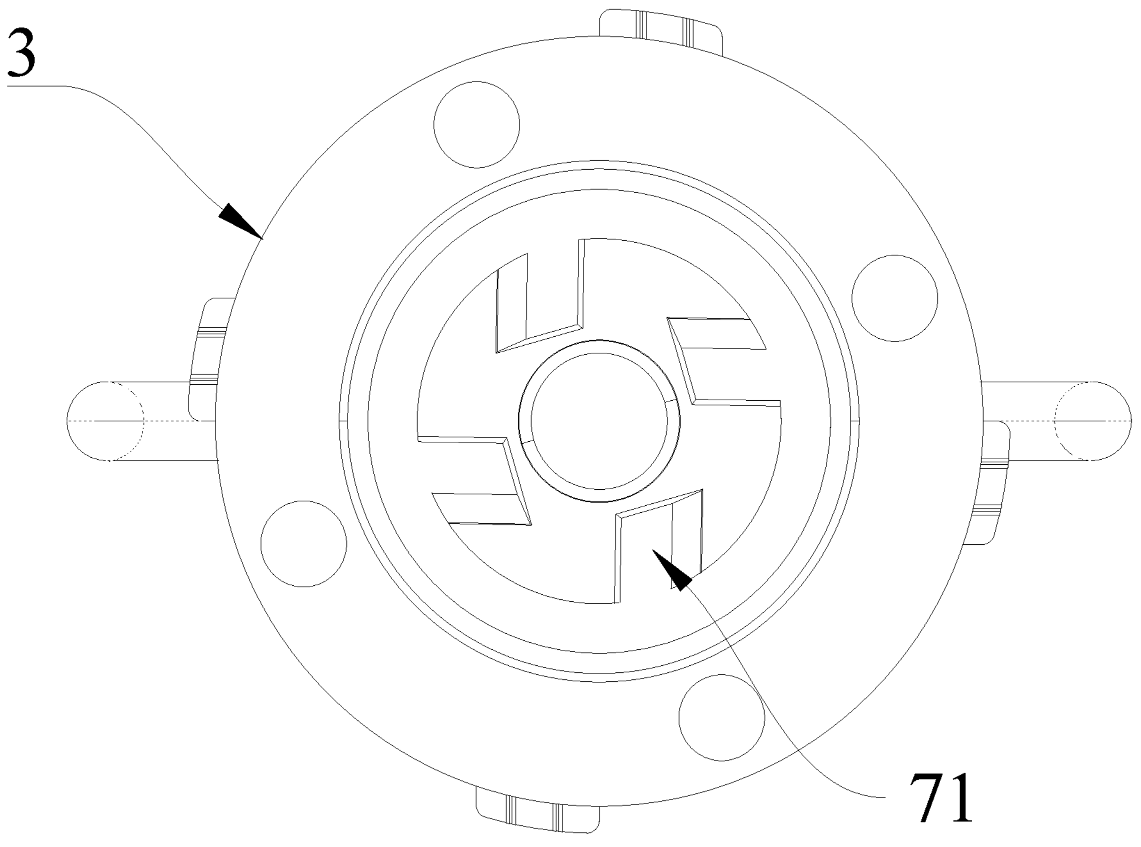
FIG. 5 is a vertical view of the stirring assembly for the stirring cup in the present disclosure in a mounted state.
Figure 6:
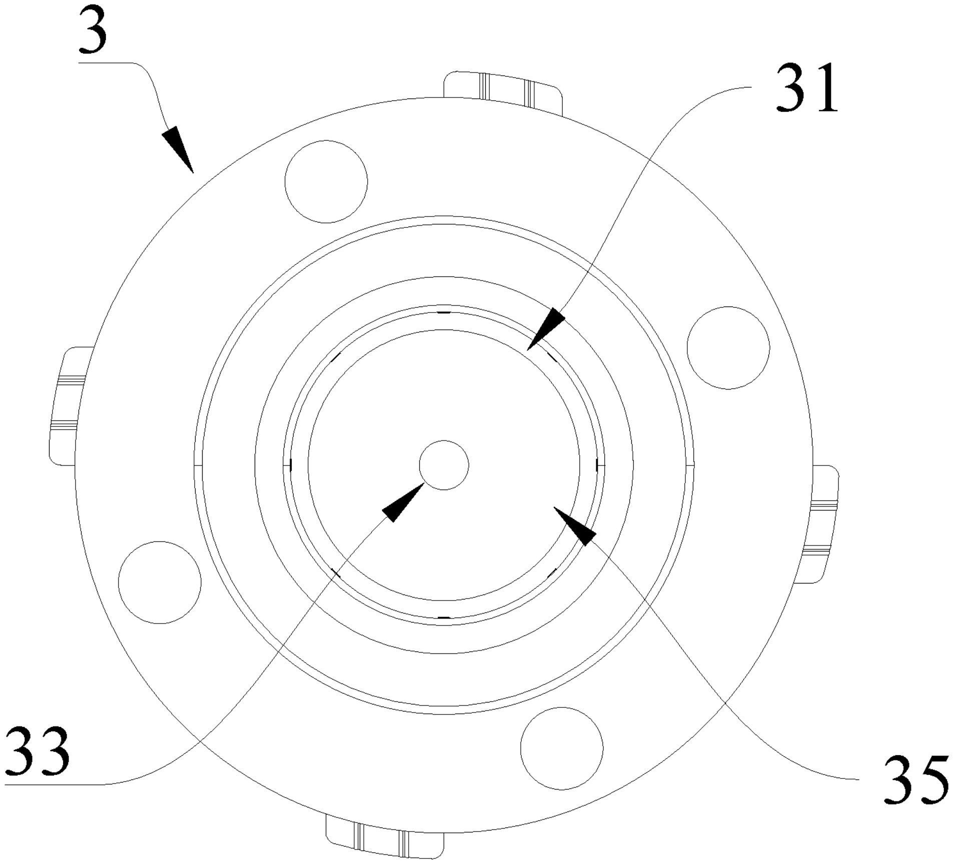
FIG. 6 is an internal structure diagram of a fixing bin of the stirring assembly for the stirring cup in the present disclosure.

Description of reference numerals: 1—stirring member; 2—waterproof member; 3—fixing bin; 31—bearing mounting groove; 32—shaft fixing sleeve; 33—first hole; 34—extrusion strip; 35—sunken groove; 4—rotating shaft; 41—knurling; 5—bearing; 6—hard transmission member; 61—bump; 62—shaft fixing member; 7—soft transmission member; and 71—transmission groove.

DETAILED DESCRIPTION OF THE EMBODIMENTS

The present disclosure is described in detail below with reference to the accompanying drawings and in conjunction with embodiments. Each example is provided to explain the present disclosure instead of limiting the present disclosure. In fact, those skilled in the art will know that modifications and variations may be made in the present disclosure without departing from the scope or spirit of the present disclosure. For example, features shown or described as part of one embodiment may be used in another embodiment to produce yet another embodiment. Therefore, it is expected that the present disclosure includes such modifications and variations that fall within the scope of the appended claims and equivalents thereof.

In the descriptions of the present disclosure, orientations or positional relationships indicated by the terms "longitudinal", "transverse", "upper", "lower", "front", "rear", "left", "right", "vertical", "horizontal", "top", "bottom" and the like are orientations or positional relationships based on the drawings, are only for the purpose of facilitating describing of the present disclosure, and do not indicate that the present disclosure must be constructed and operated in the specific orientations. Therefore, they cannot be understood as limitations on the present disclosure. The terms "connection", "connecting" and "arrangement" used in the present disclosure should be understood in a broad sense, for example, the connection may be fixed connection, and may also be detachable connection; the connection may be direct connection, and may also be indirect connection by means of intermediate components; the connection may be wired electrical connection and wireless electrical connection, and may also be wireless communication signal connection; and for those of ordinary skill in the art, the specific meanings of the above-mentioned terms can be understood according to the specific situations.

The accompanying drawings show one or more examples of the present disclosure. Numeral and letter marks are used in the detailed descriptions to refer to the features in the accompanying drawings. Similar or like reference signs in the drawings and descriptions have been used to refer to similar or like parts of the present disclosure. As used herein, the terms "first", "second", "third" and the like are used interchangeably so as to distinguish one component from another, and are not intended to indicate the positions or the importance of the individual components.

Embodiment 1

As shown in FIGS. 1-9, this embodiment of the present disclosure provides a stirring assembly for a stirring cup, including a stirring member 1 and a rotating shaft 4, where the stirring member 1 uniformly blends materials in the cup by performing rotating motion in the cup. The rotating shaft 4 can be inserted in the stirring member 1, one end of the rotating shaft 4 is detachably connected to the stirring member 1, and an outer wall of a shaft body of the rotating shaft 4 is provided with knurling 41. The knurling 41 is configured to increase the friction force between the rotating shaft 4 and the stirring member 1.

The stirring assembly further includes a waterproof member 2 and a fixing bin 3, where the waterproof member 2 is sleeved on the rotating shaft 4 between the fixing bin 3 and the stirring member 1. The other end of the rotating shaft 4 sequentially passes through the waterproof member 2 and the fixing bin 3, the top of the fixing bin 3 is provided with a first hole 33, the first hole 33 allows the rotating shaft 4 to pass, the fixing bin 3 is internally provided with an accommodating space for placing a transmission member and a bearing 5, and meanwhile, the fixing bin 3 is a plastic product or a rubber product, which can prevent moisture from entering the fixing bin 3. The rotating shaft 4, the bearing 5 and the transmission member are all coaxial, the top of the fixing bin 3 is provided with a bearing mounting groove 31 for accommodating the bearing 5, an inner wall of the bearing mounting groove 31 is provided with extrusion strips 34, the extrusion strips 34 are uniformly distributed along the circumference of the inner wall in a spaced manner in parallel with the rotating shaft 4, and the bearing mounting groove 31 is fixedly connected to an outer wall of the bearing 5 in an interference fit manner by means of the extrusion strips 34. An inner top of the bearing mounting groove 31 is further provided with a sunken groove 35 with the diameter smaller than the top diameter of the bearing mounting groove 31. The sunken groove 35 ensures a rotatable gap between an outer ring of the bearing 5 and an inner top of the fixing bin 3, thereby preventing shortening of the service life due to excessive friction between the bearing 5 and the inner top of the fixing bin 3.

The transmission member includes a hard transmission member 6 and a soft transmission member 7, the hard transmission member 6 is provided with four bumps 61, a shaft fixing member 62 is provided at the center of the top of the hard transmission member 6, and the shaft fixing member 62 is fixedly sleeved on the other end of the rotating shaft 4. The hard transmission member 6 is wrapped with the soft transmission member 7, the soft transmission member 7 is a soft rubber member, and an outer surface of the hard transmission member 6 is completely wrapped with the soft transmission member 7; and a lower surface of the hard transmission member 6 is completely wrapped with the soft transmission member 7. The soft rubber member can be made of a rubber material or a silica gel material; and the soft transmission member 7 is provided with four transmission grooves 71, and each of the transmission grooves 71 is fixedly connected to the respective bump 61 in a matching manner. The stirring assembly further includes the waterproof member 2, where the waterproof member 2 is sleeved on the rotating shaft 4 between the fixing bin 3 and the stirring member 1. The top of the fixing bin 3 further comprises a shaft fixing sleeve 32, and the shaft fixing sleeve 32 is configured to position the waterproof member 2 and serves as a waterproof platform.

An output end of an electric motor of the stirring cup is in transmission connection with the soft transmission member 7 of the transmission member, when the electric motor of the stirring cup is powered on, the output end of the electric motor sequentially drives the soft transmission member 7, the hard transmission member 6, the rotating shaft 4, the bearing 5 and the stirring member 1 to rotate, and the bearing 5 and the rotating shaft are coaxial so as to ensure stable axis transmission of the rotating shaft, thereby ensuring that the rotating shaft 4 keeps the small rotatable gap with the first hole 33 of the fixing bin 3, so as to prevent water leakage caused by enlargement of the gap.

Embodiment 2

As shown in FIGS. 1-2 and 4-10, this embodiment of the present disclosure provides a stirring assembly for a stirring cup, including a stirring member 1 and a rotating shaft 4, where the stirring member 1 uniformly blends materials in the cup by performing rotating motion in the cup. The rotating shaft 4 can be inserted in the stirring member 1, one end of the rotating shaft 4 is detachably connected to the stirring member 1, and an outer wall of a shaft body of the rotating shaft 4 is provided with knurling 41. The knurling 41 is configured to increase the friction force between the rotating shaft 4 and the stirring member 1.

Figure 10:
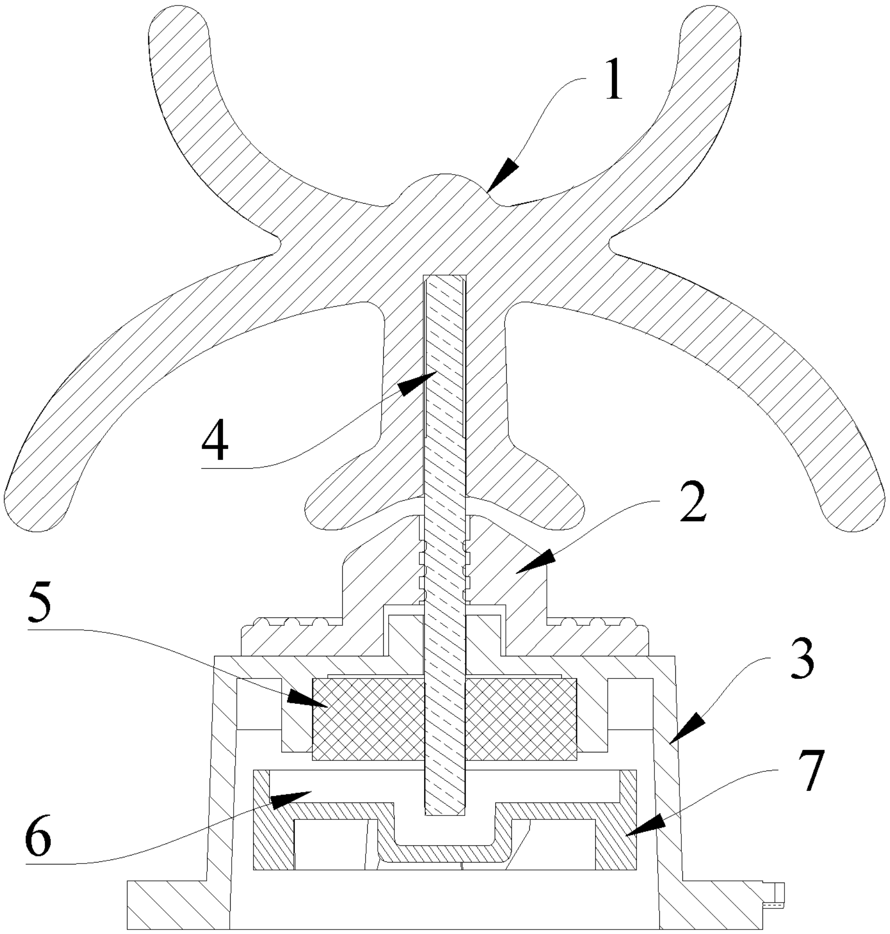
FIG. 10 is a section view of the stirring assembly in Embodiment 2 in FIG. 2 of the present disclosure in the direction A-A.

The stirring assembly further includes a waterproof member 2 and a fixing bin 3, where the waterproof member 2 is sleeved on the rotating shaft 4 between the fixing bin 3 and the stirring member 1. The other end of the rotating shaft 4 sequentially passes through the waterproof member 2 and the fixing bin 3, the top of the fixing bin 3 is provided with a first hole 33, the first hole 33 allows the rotating shaft 4 to pass, the fixing bin 3 is internally provided with an accommodating space for placing a transmission member and a bearing 5, the rotating shaft 4, the bearing 5 and the transmission member are all coaxial, as shown in FIG. 10, the outer wall of the shaft body of the rotating shaft 4 is fixedly connected to a central hole wall of the bearing 5, and the other end of the rotating shaft 4 is fixedly connected to the transmission member.

Figure 9:
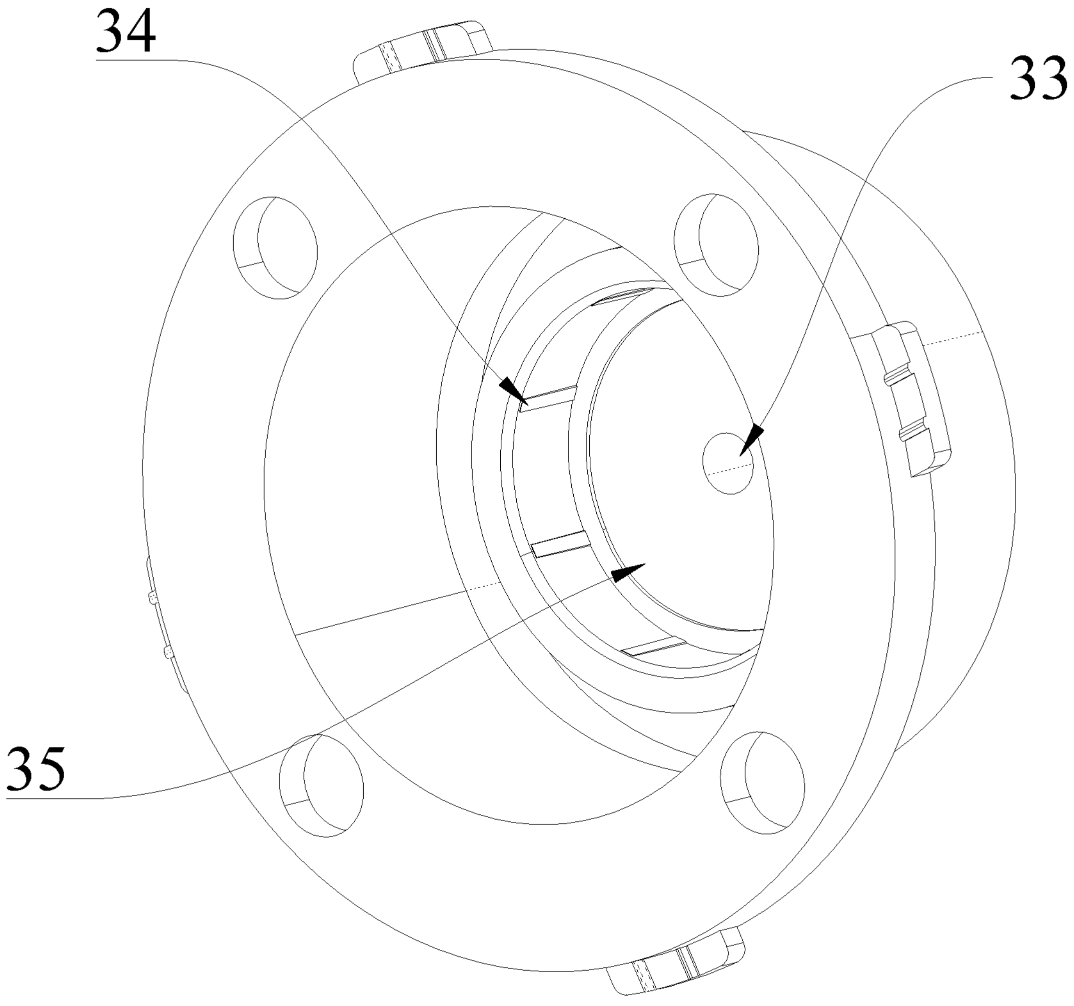
FIG. 9 is an internal structure diagram of the fixing bin of the stirring assembly for the stirring cup in the present disclosure.

As shown in FIG. 9, the top of the fixing bin 3 is provided with a bearing mounting groove 31 for accommodating the bearing 5, an inner wall of the bearing mounting groove 31 is provided with extrusion strips 34, the extrusion strips 34 are uniformly distributed along the circumference of the inner wall in a spaced manner in parallel with the rotating shaft 4, and the bearing mounting groove 31 is fixedly connected to an outer wall of the bearing 5 in an interference fit manner by means of the extrusion strips 34. An inner top of the bearing mounting groove 31 is further provided with a sunken groove 35 with the diameter smaller than the top diameter of the bearing mounting groove 31. The sunken groove 35 ensures a rotatable gap between an outer ring of the bearing 5 and an inner top of the fixing bin 3, thereby preventing shortening of the service life due to excessive friction between the bearing 5 and the inner top of the fixing bin 3.

Figure 7:
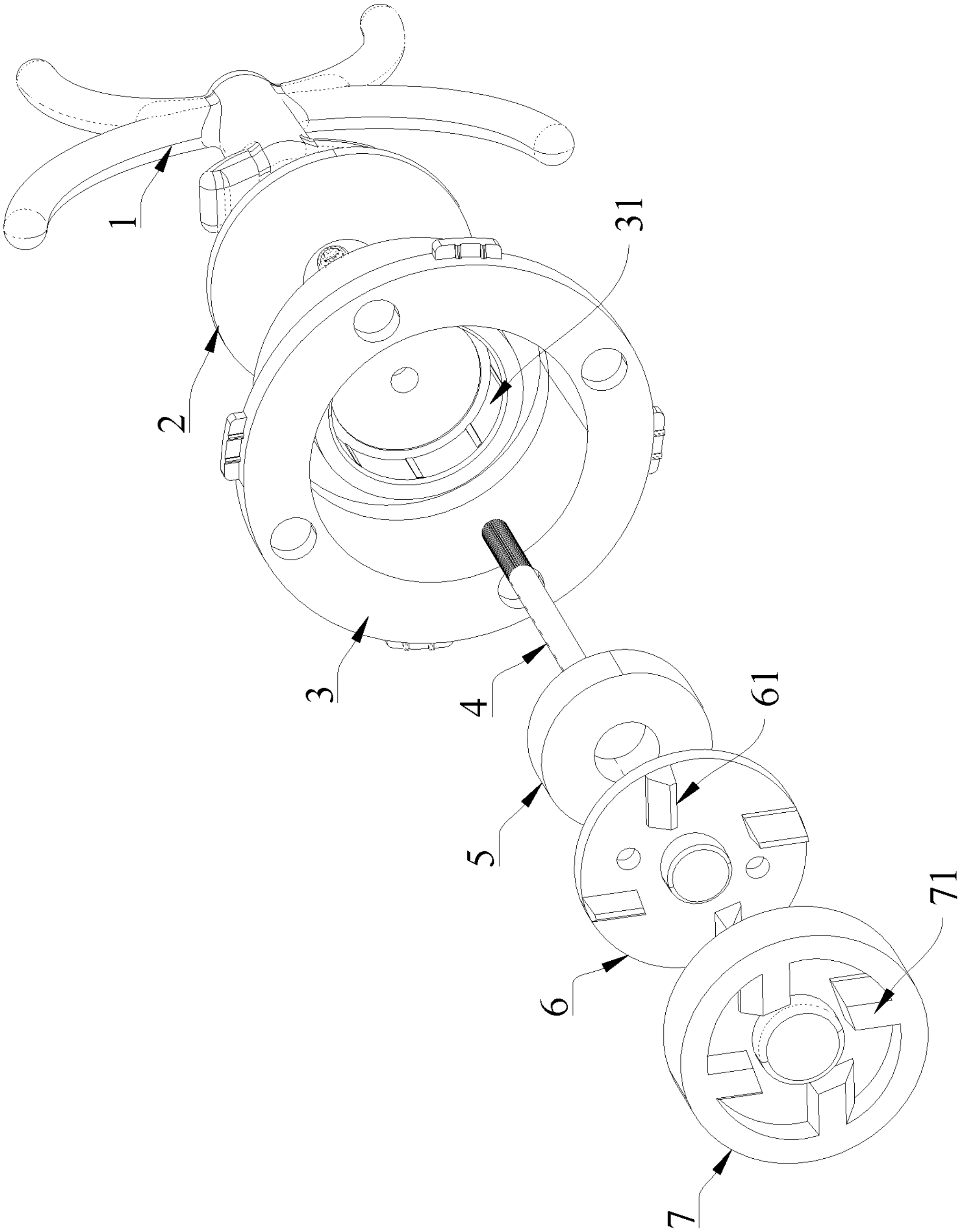
FIG. 7 is an exploded structure view of the stirring assembly for the stirring cup in the present disclosure.
Figure 8:
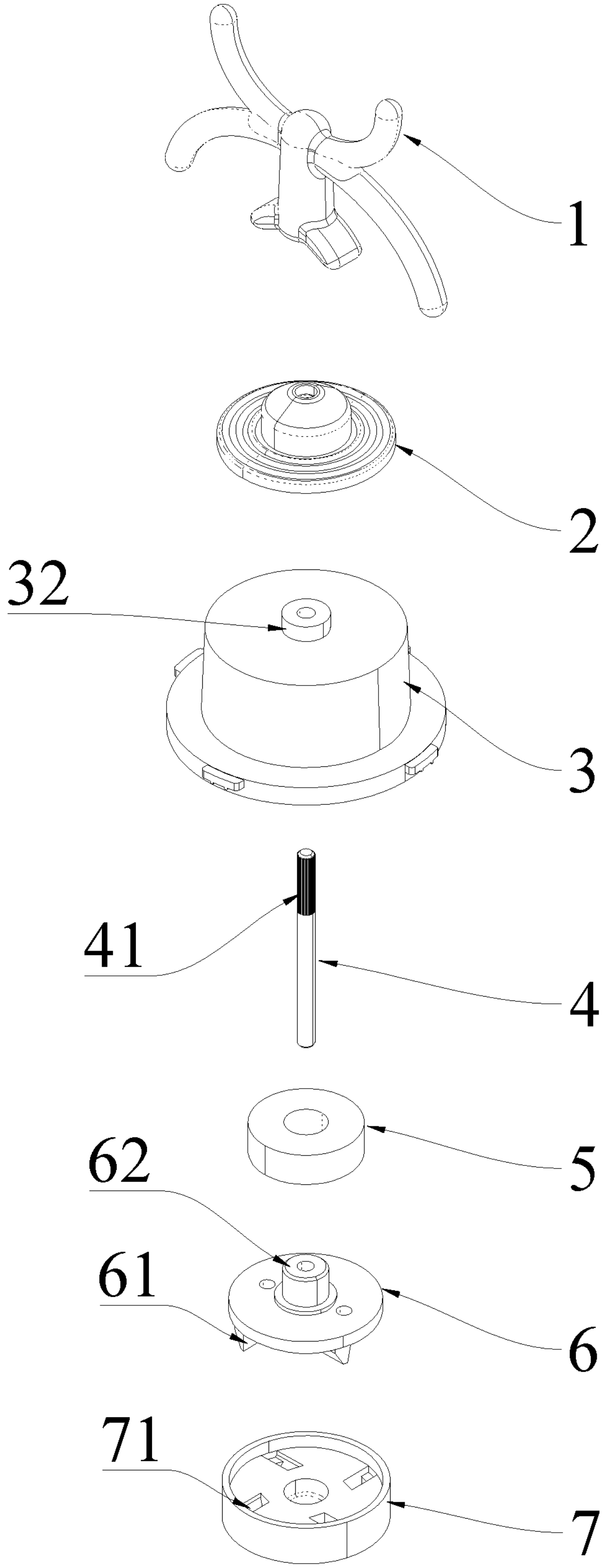
FIG. 8 is an exploded structure view of the stirring assembly for the stirring cup in the present disclosure.

As shown in FIGS. 7 and 8, the transmission member includes a hard transmission member 6 and a soft transmission member 7, the hard transmission member 6 is provided with four bumps 61, a shaft fixing member 62 is provided at the center of the top of the hard transmission member 6, and the shaft fixing member 62 is fixedly sleeved on the other end of the rotating shaft 4. The hard transmission member 6 is wrapped with the soft transmission member 7, the soft transmission member 7 is a soft rubber member, and an outer surface of the hard transmission member 6 is completely wrapped with the soft transmission member 7; and a lower surface of the hard transmission member 6 is completely wrapped with the soft transmission member 7. The soft rubber member can be made of a rubber material or a silica gel material; and the soft transmission member 7 is provided with four transmission grooves 71, and each of the transmission grooves 71 is fixedly connected to the respective bump 61 in a matching manner. The stirring assembly further includes the waterproof member 2, where the waterproof member 2 is sleeved on the rotating shaft 4 between the fixing bin 3 and the stirring member 1. The top of the fixing bin 3 further comprises a shaft fixing sleeve 32, and the shaft fixing sleeve 32 is configured to position the waterproof member 2 and serves as a waterproof platform.

An output end of an electric motor of the stirring cup is in transmission connection with the soft transmission member 7 of the transmission member, when the electric motor of the stirring cup is powered on, the output end of the electric motor sequentially drives the soft transmission member 7, the hard transmission member 6, the rotating shaft 4, the bearing 5 and the stirring member 1 to rotate, and the bearing 5 and the rotating shaft are coaxial so as to ensure stable axis transmission of the rotating shaft, thereby ensuring that the rotating shaft 4 keeps the small rotatable gap with the first hole 33 of the fixing bin 3, so as to prevent water leakage caused by enlargement of the gap.

From the above description, it can be seen that the above embodiments of the present disclosure achieve the following technical effects:

- firstly, the bearing 5 component is added to the rotating shaft 4 of the fixing bin 3, and the bearing 5 can keep the rotating shaft 4 vertical and coaxial, so that there is no need for addition of other fixing members to fix the rotating shaft 4, vertical fixing of the rotating shaft 4 is ensured, the stability is achieved, the durable abrasion resistance is achieved, the noise is avoided, better transmission can be achieved, and the abrasions are reduced;
- secondly, the sunken groove 35 provided at the inner top of the bearing mounting groove 31 ensures the rotatable gap between the outer ring of the bearing 5 and the inner top of the fixing bin 3, thereby preventing shortening of the service life due to excessive friction between the bearing 5 and the inner top of the fixing bin 3; and
- thirdly, the transmission member includes the hard transmission member 6 and the soft transmission member 7, the output end of the electric motor is in transmission connection with the soft transmission member 7, and thus the noise can be reduced; and the hard transmission member 6 is wrapped with the soft transmission member 7, so that the service life of the transmission member can be prolonged.

The above is merely illustrative of the preferred embodiments of the present disclosure and is not intended to limit the present disclosure, and various changes and modifications may be made to the present disclosure by those skilled in the art. Any modification, equivalent substitution, improvement, etc. made within the spirit and principles of the present disclosure should be included in the scope of protection of the present disclosure.

What is claimed is:

1. A stirring assembly for a stirring cup, comprising:
- a transmission member with a bottom thereof connected to an output end of an electric motor;
- a rotating shaft with one end thereof fixedly connected to the transmission member;
- a bearing which is coaxial with the rotating shaft and is sleeved on the transmission member or the rotating shaft;

a fixing bin, wherein the fixing bin is internally provided with an accommodating space configured to place the transmission member and the bearing, and a top of the fixing bin is provided with a first hole; and a stirring member, wherein an other end of the rotating shaft is capable of penetrating through the first hole to be connected to the stirring member, and the stirring member is configured to blend materials in the stirring cup by performing rotating motion in the stirring cup;

wherein the stirring assembly further comprises a waterproof member, the waterproof member is provided with a protrusion and a groove, the rotating shaft is sealed by the protrusion; the fixing bin comprises a shaft fixing sleeve, the shaft fixing sleeve is configured to protrude from the top of the fixing bin and be inserted into the groove to position the waterproof member.

2. The stirring assembly according to claim 1, wherein the fixing bin is internally provided with a bearing mounting groove for accommodating the bearing, and the fixing bin is fixedly connected to the bearing by the bearing mounting groove.

3. The stirring assembly according to claim 2, wherein an inner wall of the bearing mounting groove is provided with a plurality of extrusion strips, the plurality of extrusion strips are uniformly distributed along a circumference of the inner wall, and the fixing bin is connected to the bearing in an interference fit manner by the plurality of extrusion strips of the bearing mounting groove.

4. The stirring assembly according to claim 2, wherein an inner top of the bearing mounting groove is provided with a sunken groove with a diameter smaller than a top diameter of the bearing mounting groove.

5. The stirring assembly according to claim 1, wherein the transmission member comprises a hard transmission member, a shaft fixing member is provided at a center of a top of the hard transmission member, the bearing is coaxially and securely sleeved on an outer wall of the shaft fixing member, and the shaft fixing member is coaxially and fixedly connected to one end of the rotating shaft.

6. The stirring assembly according to claim 5, wherein the transmission member further comprises a soft transmission member, the hard transmission member is wrapped with the soft transmission member, and the soft transmission member is provided with a plurality of transmission grooves; and the hard transmission member is provided with a plurality of bumps, and each of the transmission grooves is fixedly connected to the respective bump in a matching manner.

7. The stirring assembly according to claim 1, wherein the waterproof member is sleeved on the rotating shaft between the fixing bin and the stirring member.

8. The stirring assembly according to claim 6, wherein the soft transmission member is a soft rubber member, and an outer surface or a lower surface of the hard transmission member is completely wrapped with the soft transmission member.

9. The stirring assembly according to claim 1, wherein the rotating shaft is detachably connected to the stirring member; and an outer wall of the position of the rotating shaft connected to the stirring member is provided with knurling for increasing a friction force.

10. A stirring assembly for a stirring cup, comprising:

a transmission member with a bottom thereof connected to an output end of an electric motor;

a rotating shaft with one end thereof fixedly connected to the transmission member;

a bearing which is coaxial with the rotating shaft and is sleeved on the transmission member or the rotating shaft;

a fixing bin, wherein the fixing bin is internally provided with an accommodating space configured to place the transmission member and the bearing, and a top of the fixing bin is provided with a first hole; and a stirring member, wherein an other end of the rotating shaft is capable of penetrating through the first hole to be connected to the stirring member, and the stirring member is configured to blend materials in the stirring cup by performing rotating motion in the stirring cup, wherein the fixing bin is internally provided with a bearing mounting groove for accommodating the bearing, and the fixing bin is fixedly connected to the bearing by the bearing mounting groove;

wherein an inner wall of the bearing mounting groove is provided with a plurality of extrusion strips, the plurality of extrusion strips are uniformly distributed along a circumference of the inner wall, and the fixing bin is connected to the bearing in an interference fit manner by the plurality of extrusion strips of the bearing mounting groove.

11. A stirring assembly for a stirring cup, comprising:

a transmission member with a bottom thereof connected to an output end of an electric motor;

a rotating shaft with one end thereof fixedly connected to the transmission member;

a bearing which is coaxial with the rotating shaft and is sleeved on the transmission member or the rotating shaft;

a fixing bin, wherein the fixing bin is internally provided with an accommodating space configured to place the transmission member and the bearing, and a top of the fixing bin is provided with a first hole; and a stirring member, wherein an other end of the rotating shaft is capable of penetrating through the first hole to be connected to the stirring member, and the stirring member is configured to blend materials in the stirring cup by performing rotating motion in the stirring cup, wherein the transmission member comprises a hard transmission member, a shaft fixing member is provided at a center of a top of the hard transmission member, the bearing is coaxially and securely sleeved on an outer wall of the shaft fixing member, and the shaft fixing member is coaxially and fixedly connected to one end of the rotating shaft.

12. The stirring assembly according to claim 11, wherein the transmission member further comprises a soft transmission member, the hard transmission member is wrapped with the soft transmission member, and the soft transmission member is provided with a plurality of transmission grooves; and the hard transmission member is provided with a plurality of bumps, and each of the transmission grooves is fixedly connected to the respective bump in a matching manner.

13. The stirring assembly according to claim 12, wherein the soft transmission member is a soft rubber member, and an outer surface or a lower surface of the hard transmission member is completely wrapped with the soft transmission member.

14. A stirring assembly for a stirring cup, comprising:

a transmission member with a bottom thereof connected to an output end of an electric motor;

a rotating shaft with one end thereof fixedly connected to the transmission member;

a bearing which is coaxial with the rotating shaft and is sleeved on the transmission member or the rotating shaft;

a fixing bin, wherein the fixing bin is internally provided with an accommodating space configured to place the transmission member and the bearing, and a top of the fixing bin is provided with a first hole; and a stirring member, wherein an other end of the rotating shaft is capable of penetrating through the first hole to be connected to the stirring member, and the stirring member is configured to blend materials in the stirring cup by performing rotating motion in the stirring cup, wherein the rotating shaft is detachably connected to the stirring member; and an outer wall of the position of the rotating shaft connected to the stirring member is provided with knurling for increasing a friction force.

* * * * *